Patented Apr. 7, 1936

2,036,402

UNITED STATES PATENT OFFICE 2,036,402

SULPHO-AROMATIC DERIVATIVES OF HENDECENOIC ACID AND METHOD OF PRODUCING SAME

Melvin De Groote, St. Louis, and Bernhard Keiser, Webster Groves, Mo., assignors to Tretolite Company, Webster Groves, Mo., a corporation of Missouri No Drawing. Application December 31, 1934, Serial No. 760,027

13 Claims. (Cl. 260—108)

This invention relates to a new sulpho-aromatic fatty body and to a method of producing the same.

One object of our invention is to provide a new material, composition of matter, or chemical compound, that is capable of various industrial uses, but particularly adapted for use as a substitute for Turkey red oil or Twitchell reagents, Petroff reagents, and the like. Said new composition of matter may be described as a sulphoaromatic substituent product of hendecoic acid (sometimes referred to as "hendecatoic acid" or as "undecylic acid" ($C_{11}H_{22}O_2$)). Similarly, said new composition of matter may be considered as an addition product of hendecenoic acid, (sometimes referred to as "undecylenic acid" ($C_{11}H_{20}O_2$)). The analogy to various sulpho-aromatic stearic acids which are obtained by the sulphonation of oleic acid in presence of a suitable aromatic compound is obvious. Thus, these last mentioned sulpho compounds may be considered as addition products of oleic acid, such as oleic acid hydrogen phenyl sulphonic acid. Certain materials similar to hendecenoic acids may be obtained from oxidized, relatively highly unsaturated fatty bodies, such as oxidized sardine oil or the like.

Hendecenoic acid is obtained by distilling ricinoleic acid or the glyceride thereof (castor oil) under diminished or atmospheric pressure. It is sometimes known as "undecylenic acid". The method of producing this acid is well known and is described in the publication "Dictionary of Applied Chemistry", by Thorpe, 1922. In volume 4, pages 630 and 631 of the said publication, the preparation of hendecenoic acid is properly indicated as follows:

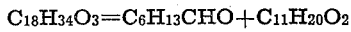

$$C_{18}H_{34}O_3 = C_6H_{13}CHO + C_{11}H_{20}O_2$$

but in the text the term "hendecatoic acid" is erroneously used to refer to the product $C_{11}H_{20}O_2$. However, volume 3, page 515 of the said publication properly identifies hendecatoic acid as "undecylic acid" ($C_{11}H_{22}O_2$). In other words, the pyrolytic decomposition of ricinoleic acid or castor oil causes the molecule to break at the hydroxyl position and yields an unsaturated "fatty" acid having 11 carbon atoms. It is understood that the expression "fatty" is used because the acid thus obtained is a lower homologue of oleic acid, but as far as we are aware, does not occur naturally in any fat or oil.

The production of hendecenoic acid from ricinoleic acid or castor oil by thermal decomposition with the simultaneous production of an aldehyde (heptoic aldehyde) appears to be due to the fact that ricinoleic acid contains both an ethylene linkage and a hydroxy radical, and in that respect is unique, as far as naturally-occurring commercial oils or fats are concerned.

It is well known that oleic acid may be sulphonated at a relatively low temperature, for instance, 35° or less, with 66° Baumé sulphuric acid to yield a fatty acid sulphate, i. e., oleic acid hydrogen hydrogen sulphate. It is also known that oleic acid may be sulphonated at or near the boiling point of water with sulphuric acid, or at a lower temperature with an onium compound of sulphuric acid to yield a true sulphonic acid. Such true sulphonic acids are differentiated from fatty acid sulphates above referred to, by the fact that they do not decompose on boiling with dilute hydrochloric acid. Another well known procedure for sulphonating oleic acid, is to sulphonate, in the presence of a suitable aromatic compound, such as benzene, phenol, naphthalene, beta naphthol, etc., so as to produce a sulpho-aromatic "fatty" acid. Such sulphonation products are characterized by the presence of a sulphonic acid radical, but said sulphonic acid radical is attached to the aromatic nucleus and not directly to the hydrocarbon fatty chain of the fatty acid.

U. S. Patent No. 1,749,463, to Bertsch, dated March 4, 1930, discloses a method of sulphonating hendecenoic acid, but does not disclose the production of sulpho-aromatic derivatives of hendecenoic acid. The manufacture of sulpho-aromatic derivatives of hendecenoic acid is disclosed, but not claimed, in our co-pending application for patent Serial No. 760,024, filed December 31, 1934, now Patent No. 2,026,218, dated Dec. 31, 1935, in which we contemplate the use of sulphohendecenoic acid or its salts or esters for breaking petroleum emulsions of the water-in-oil type.

The manufacture of sulpho-aromatic compounds from oleic acid so as to produce Twitchell reagents is well known. In a general way, the procedure is to mix a molecular proportion of oleic acid or its glyceride with a molecular proportion of a selected aromatic compound, such as benzene, phenol, naphthalene, beta naphthol, etc., and then subject the mixture to treatment with an excess of 66° Baumé sulphuric acid.

We have found that the same procedure, with slight variations, may be employed for the manufacture of sulpho-aromatic derivatives of hendecenoic acid. We have found it extremely desirable to add acetic anhydride or some equivalent organic anhydride or anhydrous organic acid, such as glacial acetic acids, to the hendecenoic acid, after admixture with a selected aromatic.

and before addition of sulphuric acid. Furthermore, we have found it possible to use either stronger sulphuric acid or weaker sulphuric acid in some instances to produce a smoother reaction. For instance, if phenol is used as the selected aromatic, it is sometimes desirable to use 65° Baumé sulphuric acid, whereas, if beta naphthol is used, it is sometimes desirable to use monohydrate or 5% of oleum, instead of 66° Baumé acid. The amount of organic anhydride or similar material employed may vary, but generally is not over 30% by weight of the fatty material, and this is especially true if acetic anhydride is employed.

We prefer to prepare the new material or composition of matter herein described in the following manner: 600 lbs. of hendecenoic acid or its ester, obtained by thermal decomposition of castor oil, is mixed with approximately 275 lbs. naphthalene and approximately 200 lbs. of acetic anhydride. The mixture is stirred so as to keep the suspended mass uniform, and sulphuric acid of 66° Baumé is added and the temperature maintained at approximately 10° C. until an amount of sulphuric acid equal in weight to all the previous ingredients, i. e., until 1075 lbs. of sulphuric acid, or at least 1,000 lbs. of sulphuric acid, are added. In event of any difficulty with polymerization, more acetic anhydride should be added and the strength of the sulphuric acid increased by addition of small amounts of oleum, so as to complete the sulphonation reaction with a homogeneous, non-gummy, non-resinous mixture. When the sulphonation reaction is completed, the reaction mass should be water-soluble. The sulphonation mass is then diluted with an equal quantity of water and allowed to separate. The lower aqueous layer is withdrawn. The acidic material may be employed as such for various purposes, such as splitting of fats, breaking emulsions, etc., or may be neutralized or esterified and used for any suitable purpose, such as a Turkey red oil substitute, resolution of petroleum emulsions, etc. However, we prefer to neutralize the same with strong ammonium hydroxide so as to neutralize all of the sulphonic hydrogen and sufficient of the carboxylic hydrogen to give a clear, transparent, water-soluble mass.

It is understood, of course, that any suitable aromatic compound may be employed, and that conditions may be varied in regard to increasing or decreasing the amount of acetic anhydride or the like or in regard to the strength or amount of sulphonating agent so as to speed up or control the reaction. It is also understood that such sulpho-aromatic derivatives of hendecenoic acid are accompanied by certain compounds of the same kind that accompany sulpho-aromatic stearic acid in the course of its manufacture. The sulphonation mass above described, after washing, represents only a crude form in the same way that sulpho-naphthalene stearic acid as a commercially prepared product represents a crude form. The crude form may be employed for practically all commercial purposes. If one desires to purify the product, the same procedure is employed as is employed for the purification of Twitchell reagents. In a general way, the procedure is as follows: The crude sulpho-aromatic fatty product is diluted with water and boiled so as to decompose any fatty sulphates present. It is allowed to separate so that water, free sulphuric acid and aromatic sulphonic acids are withdrawn. The process may be repeated a second time. The material is then diluted with water and extracted with a suitable solvent, such as ether or benzol, so as to remove any oil-soluble, water-insoluble, non-sulphonated fatty bodies. The water is then evaporated and the final product neutralized if desired.

It is prefectly evident that one can produce various salts or esters, or half salts, or half esters, to the extent that dibasic acids are present, from the sulpho-aromatic derivatives herein described, in the same way that one may produce them in any dibasic acid, particularly one in which one acid hydrogen is supplied by a sulphonic acid radical, and the other acid hydrogen by carboxylic hydrogen. Thus, one might neutralize a sulphonic hydrogen with the hydroxides or carbonates of sodium, ammonium, potassium, calcium, magnesium, or with a basic amine, such as triethanolamine, etc. One may neutralize a carboxylic hydrogen in the same manner, or one might esterify the carboxylic hydrogen instead of replacing it by a metallic atom. One may replace the sulphonic hydrogen by one metallic atom, such as the sodium atom, and one may neutralize the carboxylic hydrogen with sufficient ammonium hydroxide to give a clear transparent product. The ammonium radical is considered in its customary sense as the equivalent of a metallic atom. Various aliphatic, aromatic or cyclic esters might be formed. For instance, one might prepare the ethyl, methyl, propyl, butyl, amyl, hexyl, or octyl ester.

Having thus clearly described the method of producing the new material or composition of matter forming the subject-matter of our present application for patent, we will now consider structural formulas which clearly indicate the composition of the same.

The structure of oleic acid may be shown thus:

Similarly, a sulpho-aromatic derivative thereof, for instance, the sulpho-benzene derivative thereof, may be indicated by the following formula:

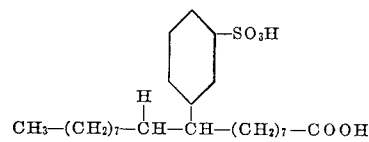

The formula is not intended to differentiate between isomers, i. e., it is immaterial whether the sulpho-aromatic radical is attached to the 9th carbon or the 10th carbon atom in a hydrocarbon chain. The comparable compound, prepared from hendecenoic acid, may be indicated by the formula:

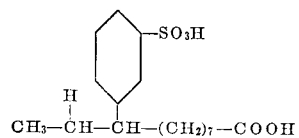

The aromatic nucleus need not be supplied by benzene, but may be supplied by any of the compounds previously mentioned, and thus R may be used to represent any suitable aromatic radical and the previous formula may be re-written as follows:

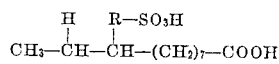

As previously pointed out, our new material or composition of matter need not be in the form of an acid, but may be in the form of an ester.

and therefore, the previous formula may be rewritten as follows:

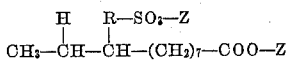

in which Z represents an acidic hydrogen atom or its equivalent, such as a metallic atom, including a sodium atom, a potassium atom, an ammonium radical, a basic amine radical, or a radical derived from an alcohol, such as an ethyl radical, a methyl radical, etc. Some of the forms thus available may be water-soluble, and some may be oil-soluble, and some may be soluble in both oil and water. It is understood, of course, that instead of an unsubstituted aromatic nucleus, an aromatic nucleus substituted by some other atom or radical may be employed. Thus, instead of naphthalene one may employ chlornaphthalene or methyl naphthalene or di-methyl naphthalene. Similarly, instead of benzene, one might employ cymene, which is iso-propyl methyl benzene. Instead of anthracene, one might employ butyl anthracene, etc.

The formulas herein employed are not intended to distinguish between isomeric forms either in regard to which particular carbon atom in the chain is connected with the aromatic nucleus or in regard to the position of the sulphonic group in the aromatic nucleus. The sulpho-aromatic residue may be attached to either one of the two carbon atoms which originally formed the ethylene linkage prior to saturation. If the sulpho-aromatic residue is attached to one carbon atom, then invariably and inevitably a non-acidic hydrogen atom is attached to the other carbon atom. Hence the prior formula is best written thus:

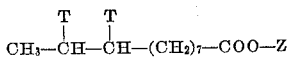

in which one occurrence of T represents the radical (—R—SO₃—Z) and the other occurrence of T represents a non-acidic hydrogen atom, R having the same significance as previously.

The word "salt" is intended to include half-salts, and the word "ester" to include half-esters.

Having thus described our invention, what we claim as new and desire to secure by Letters Patent is:

1. A method of producing a new composition of matter, characterized by sulphonating, in presence of a compound selected from the class consisting of water-soluble, low molecular weight, anhydrous fatty acids and their anhydrides, a mixture containing hendecenoic acid of the formula:

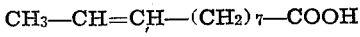

and an aromatic compound suitable for condensation by combination at the ethylene linkage of the hendecenoic acid; said sulphonation being followed by the conventional steps of washing, separation and neutralization.

2. A method of producing a new composition of matter, characterized by sulphonating, in presence of a compound selected from the class consisting of water-soluble, low molecular weight, anhydrous fatty acids and their anhydrides, a mixture containing hendecenoic acid of the formula:

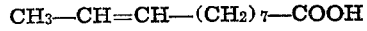

and a naphthalene body; said sulphonation being followed by the conventional steps of washing, separation and neutralization.

3. A method of producing a new composition of matter, characterized by sulphonating, in presence of a compound selected from the class consisting of water-soluble, low molecular weight, anhydrous fatty acids and their anhydrides, a mixture containing hendecenoic acid of the formula:

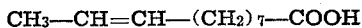

and naphthalene; said sulphonation being followed by the conventional steps of washing, separation and at least partial neutralization with ammonium hydroxide.

4. A method of producing a new composition of matter, characterized by sulphonating, in presence of a compound selected from the class consisting of water-soluble, low molecular weight, anhydrous fatty acids and their anhydrides, a mixture containing hendecenoic acid of the formula:

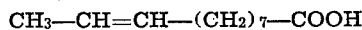

and naphthalene; said sulphonation being followed by the conventional steps of washing, separation, and complete neutralization of the sulphonic acid hydrogen and at least partial neutralization of the carboxylic acid hydrogen with ammonium hydroxide.

5. A new composition of matter consisting of a sulpho-aromatic derivative of hendecenoic acid characterized by the type formula

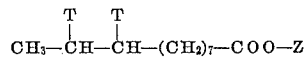

in which one occurrence of T represents a hydrogen atom and the other occurrence of T represents a sulpho-aromatic radical of the type (—R—SO₃—Z); R being an aromatic nucleus and Z at either occurrence being an acidic hydrogen atom equivalent selected from the class consisting of an acidic hydrogen atom, metallic atoms and organic radicals and said sulpho-aromatic derivative of hendecenoic acid being derived by sulphonation in presence of a chemical compound selected from the class of anhydrous organic acids and their anhydrides.

6. A new composition of matter consisting of a sulpho-aromatic derivative of hendecenoic acid, in the form of an acid, characterized by the type formula

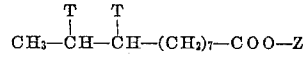

in which one occurrence of T represents a hydrogen atom and the other occurrence of T represents a sulpho-aromatic radical of the type (—R—SO₃—Z); R being an aromatic nucleus and Z at at least one occurrence represents an acidic hydrogen atom and the other occurrence of Z represents an acidic hydrogen atom equivalent selected from the class consisting of an acidic hydrogen atom, metallic atoms and organic radicals and said sulpho-aromatic derivative of hendecenoic acid being derived by sulphonation in presence of a chemical compound selected from the class of anhydrous organic acids and their anhydrides.

7. A new composition of matter consisting of a sulpho-aromatic derivative of hendecenoic acid, in the form of a salt, characterized by the type formula

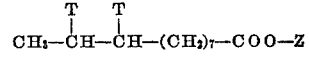

in which one occurrence of T represents a hydrogen atom and the other occurrence of T represents a sulpho-aromatic radical of the type (—R—SO₃—Z); R being an aromatic nucleus and at least one occurrence of Z represents a metallic atom and the other occurrence of Z represents an acidic hydrogen atom equivalent selected from the class consisting of an acidic hydrogen atom, metallic atoms and organic radicals and said sulpho-aromatic derivative of hendecenoic acid being derived by sulphonation in presence of a chemical compound selected from the class of anhydrous organic acids and their anhydrides.

8. A new composition of matter consisting of a sulpho-aromatic derivative of hendecenoic acid, in the form of an ester, characterized by the type formula $$CH_3-\underset{\underset{T}{|}}{C}H-\underset{\underset{T}{|}}{C}H-(CH_2)_7-COO-Z$$

in which one occurrence of T represents a hydrogen atom and the other occurrence of T represents a sulpho-aromatic radical of the type (—R—SO$_3$—Z); R being an aromatic nucleus and at least one occurrence of Z represents an organic radical and the other occurrence of Z represents an acidic hydrogen atom equivalent selected from the class consisting of an acidic hydrogen atom, metallic atoms and organic radicals and said sulpho-aromatic derivative of hendecenoic acid being derived by sulphonation in presence of a chemical compound selected from the class of anhydrous organic acids and their anhydrides.

9. A new composition of matter consisting of a sulpho-aromatic derivative of hendecenoic acid, in the form of a water soluble salt, characterized by the type formula $$CH_3-\underset{\underset{T}{|}}{C}H-\underset{\underset{T}{|}}{C}H-(CH_2)_7-COO-Z$$

in which one occurrence of T represents a hydrogen atom and the other occurrence of T represents a sulpho-aromatic radical of the type (—R—SO$_3$—Z); R being an aromatic nucleus and at least one occurrence of Z represents an acidic hydrogen atom equivalent selected from the class consisting of an acidic hydrogen atom, metallic atoms and organic radicals and said sulpho-aromatic derivative of hendecenoic acid being derived by sulphonation in presence of a chemical compound selected from the class of anhydrous organic acids and their anhydrides.

10. A new composition of matter consisting of a sulpho-aromatic derivative of hendecenoic acid, in the form of a water soluble ammonium salt, characterized by the type formula $$CH_3-\underset{\underset{T}{|}}{C}H-\underset{\underset{T}{|}}{C}H-(CH_2)_7-COO-Z$$

in which one occurrence of T represents a hydrogen atom and the other occurrence of T represents a sulpho-aromatic radical of the type (—R—SO$_3$—Z); R being an aromatic nucleus and at least one occurrence of Z represents an ammonium radical and the other occurrence of Z represents an acidic hydrogen atom equivalent selected from the class consisting of an acidic hydrogen atom, metallic atoms and organic radicals and said sulpho-aromatic derivative of hendecenoic acid being derived by sulphonation in presence of a chemical compound selected from the class of anhydrous organic acids and their anhydrides.

11. A new composition of matter consisting of a sulpho-aromatic derivative of hendecenoic acid, in the form of a water soluble ammonium salt, characterized by the type formula $$CH_3-\underset{\underset{T}{|}}{C}H-\underset{\underset{T}{|}}{C}H-(CH_2)_7-COO-Z$$

in which one occurrence of T represents a hydrogen atom and the other occurrence of T represents a sulpho-aromatic radical of the type (—R—SO$_3$—Z); R being a polycyclic aromatic nucleus and at least one occurrence of Z represents an ammonium radical and the other occurrence of Z represents an acidic hydrogen atom equivalent selected from the class consisting of an acidic hydrogen atom, metallic atoms and organic radicals and said sulpho-aromatic derivative of hendecenoic acid being derived by sulphonation in presence of a chemical compound selected from the class of anhydrous organic acids and their anhydrides.

12. A new composition of matter consisting of a sulpho-aromatic derivative of hendecenoic acid, in the form of a water soluble ammonium salt, characterized by the type formula $$CH_3-\underset{\underset{T}{|}}{C}H-\underset{\underset{T}{|}}{C}H-(CH_2)_7-COO-Z$$

in which one occurrence of T represents a hydrogen atom and the other occurrence of T represents a sulpho-aromatic radical of the type (—R—SO$_3$—Z); R being a naphthalene nucleus and at least one occurrence of Z represents an ammonium radical and the other occurrence of Z represents an acidic hydrogen atom equivalent selected from the class consisting of an acidic hydrogen atom, metallic atoms and organic radicals and said sulpho-aromatic derivative of hendecenoic acid being derived by sulphonation in presence of a chemical compound selected from the class of anhydrous organic acids and their anhydrides.

13. A new composition of matter consisting of a sulpho-aromatic derivative of hendecenoic acid, in the form of a water soluble ammonium salt, characterized by the type formula $$CH_3-\underset{\underset{T}{|}}{C}H-\underset{\underset{T}{|}}{C}H-(CH_2)_7-COO-Z$$

in which one occurrence of T represents a hydrogen atom and the other occurrence of T represents a sulpho-aromatic radical of the type (—R—SO$_3$—Z); R being a naphthalene nucleus and Z at both occurrences represents an ammonium radical, and said sulpho-aromatic derivative of hendecenoic acid being derived by sulphonation in presence of a chemical compound selected from the class of anhydrous organic acids and their anhydrides.

MELVIN DE GROOTE.
BERNHARD KEISER.